United States Patent
Sullivan

(10) Patent No.: US 6,705,965 B2
(45) Date of Patent: Mar. 16, 2004

(54) CARRIER ASSEMBLY FOR DRIVE AXLE

(75) Inventor: William C. Sullivan, Newark, OH (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 10/113,438

(22) Filed: Mar. 29, 2002

(65) Prior Publication Data

US 2003/0186774 A1 Oct. 2, 2003

(51) Int. Cl.[7] ............................................. F16H 48/06
(52) U.S. Cl. ...................................... 475/230; 475/220
(58) Field of Search ................................. 475/230, 220, 475/231; 74/607; 180/378, 380

(56) References Cited

U.S. PATENT DOCUMENTS

| | | | | |
|---|---|---|---|---|
| 805,740 A | * | 11/1905 | Lowe | 475/230 |
| 904,774 A | * | 11/1908 | Gulick | 475/230 |
| 1,076,560 A | * | 10/1913 | Duffy | 475/230 |
| 1,106,149 A | * | 8/1914 | Loomis | 475/230 |
| 1,471,915 A | * | 10/1923 | Page | 475/230 |
| 2,219,025 A | * | 10/1940 | Vanderberg | 475/230 |
| 3,131,578 A | * | 5/1964 | Elliott | 475/230 |
| 4,733,578 A | * | 3/1988 | Glaze et al. | 475/230 |
| 6,200,241 B1 | * | 3/2001 | Pinotti et al. | 475/230 |
| 6,203,464 B1 | * | 3/2001 | Ishikawa et al. | 475/230 |

* cited by examiner

*Primary Examiner*—Roger Pang
(74) *Attorney, Agent, or Firm*—Carlson, Gaskey & Olds

(57) ABSTRACT

A carrier assembly for a drive axle includes an pinion and ring gear input that is operably coupled to a differential assembly. The differential assembly includes first and second case halves that attach to each other at an interface to define a case split line and a differential gear assembly supported by the first and second case halves with the gear assembly being operably coupled to drive a pair of laterally spaced wheels. The ring gear, first case half, and second case half are all connected together via a single bolted joint with the case split line being located behind the ring gear. The differential housing is supported on a pair of tapered roller bearings having a diverging apex configuration to reduce cup rotation. The pinion gear is solely supported by a pair of tapered roller bearings positioned on opposite sides of the ring gear. A two-piece pinion cage supports both pinion bearings and facilitates the setting of preload with the use of external shims.

20 Claims, 3 Drawing Sheets

CARRIER ASSEMBLY FOR DRIVE AXLE

BACKGROUND OF THE INVENTION

This invention relates to a unique carrier and differential assembly configuration for a drive axle.

Drive axles include carriers with differential gear assemblies to prevent wheel skid during turning maneuvers. When a vehicle travels along a straight-line path, both sets of wheels on a drive axle will turn at basically the same speed. During a turning maneuver, however, the wheels on the outside of the turn must travel a greater distance than the wheels on the inside of the turn, which means that the wheels on the outside of the turn must rotate at a faster speed than the wheels on the inside of the turn. A differential gear assembly is required to allow for this difference in wheel speed.

Traditionally, a drive axle carrier includes a ring and pinion gear input that is operably coupled to the differential assembly. The pinion is supported on a pinion shaft by a pair of tapered roller bearings on one side of the pinion gear and by a spigot bearing on the opposite side of the pinion gear. The differential assembly includes a first differential case half, a second differential case half, and a differential gear set. The ring gear is bolted to one of the case halves to define a first bolted joint and the first and second case halves are bolted together to define a second bolted joint.

This traditional pinion bearing support and differential case configuration is expensive to manufacture and difficult to assemble. Also, with the increased demand by users to provide more robust designs within the same packaging space, these traditional configurations do not provide room to make critical components more robust within the existing package.

Accordingly, it is desirable to provide an improved carrier with a differential assembly that includes a more robust component configuration within the same package. Further, it is desirable to provide a simplified carrier configuration that reduces the overall number of required components and is less expensive to manufacture, as well as overcoming the other deficiencies in the art outlined above.

SUMMARY OF THE INVENTION

A drive axle includes a carrier with a differential assembly. A pinion gear, operably coupled to a driving input, is in meshing engagement with a ring gear for rotation relative to a carrier housing. The differential assembly includes first and second differential case halves attachable at a case interface to define a case split line. The differential assembly also includes a differential gear assembly supported by the first and second differential case halves with the gear assembly being operably coupled to drive a pair of laterally spaced wheels. In the preferred embodiment, the ring gear, first case half, and second case half are all connected together via a single bolted joint with the case split line being located behind the ring gear.

Further, the differential case halves are each supported by a single differential bearing assembly. Each differential bearing assembly is installed between the respective differential case half and an adjusting ring. The differential bearings are mounted in a reverse configuration with the bearing cups being pressed into the differential case half and the cones being pressed onto the adjusting rings such that the bearing apexes diverge from one another. This bearing configuration provides increased stability.

In one disclosed embodiment, the pinion gear is supported on a pinion shaft between a pair of bearings. Preferably, the bearings are tapered roller bearings that provide the sole rotational support for the pinion shaft. A pinion cage has a first piece that supports one of the bearings and a second piece that supports the other bearing. The first piece is preferably threadably attached to the second piece to simplify the setting of preload.

The subject invention provides an improved carrier with differential assembly that significantly reduces the number of required components, improves and simplifies assembly, as well as providing a more robust design within a traditionally sized packaging envelope. These and other features of the present invention can be best understood from the following specifications and drawings, the following of which is a brief description.

DETAILED DESCRIPTION OF A PREFERRED EMBODIMENT

Figure 1:
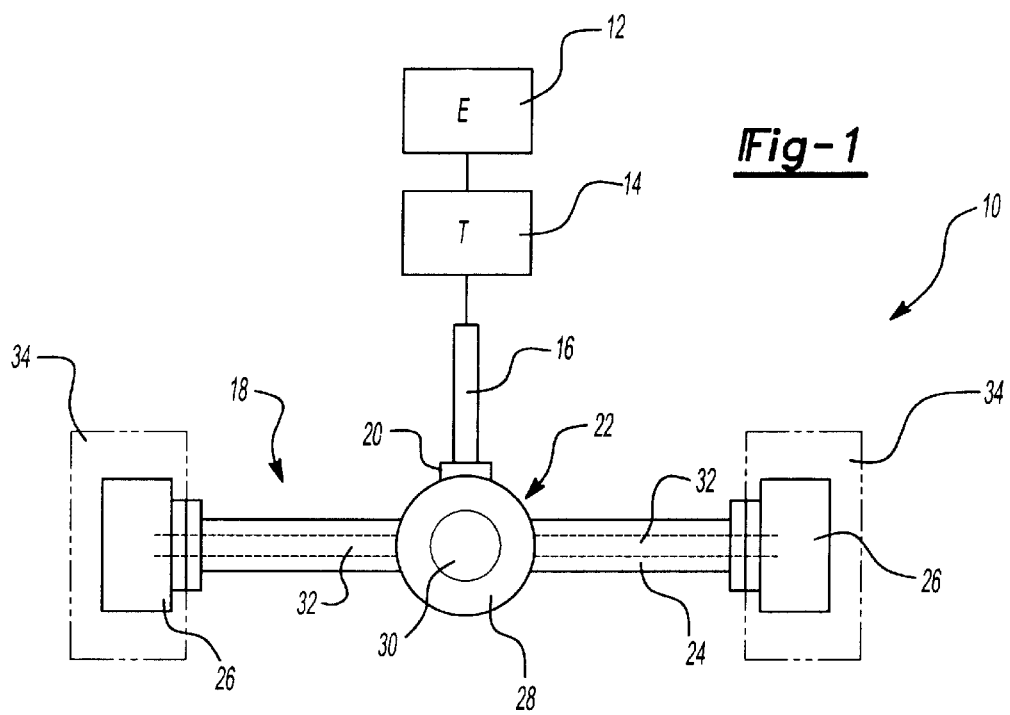
FIG. 1 is a schematic diagram of a drive axle assembly.

A powertrain assembly is shown generally at 10 in FIG. 1. The powertrain assembly 10 includes an engine 12 and transmission 14 that drive a driveshaft 16 as is known in the art. The driveshaft 16 is coupled to a drive axle 18 at an input 20. The drive axle 18 includes a carrier 22, axle housing 24, and a pair of laterally spaced wheel ends 26 positioned on opposing ends of the axle housing. 24.

The carrier 22 includes a carrier housing 28 and differential assembly 30 that is operably coupled to drive a pair of axle shafts 32. The axle shafts 32 drive the wheel ends 26, which support tires 34 as is known in the art.

Figure 2:
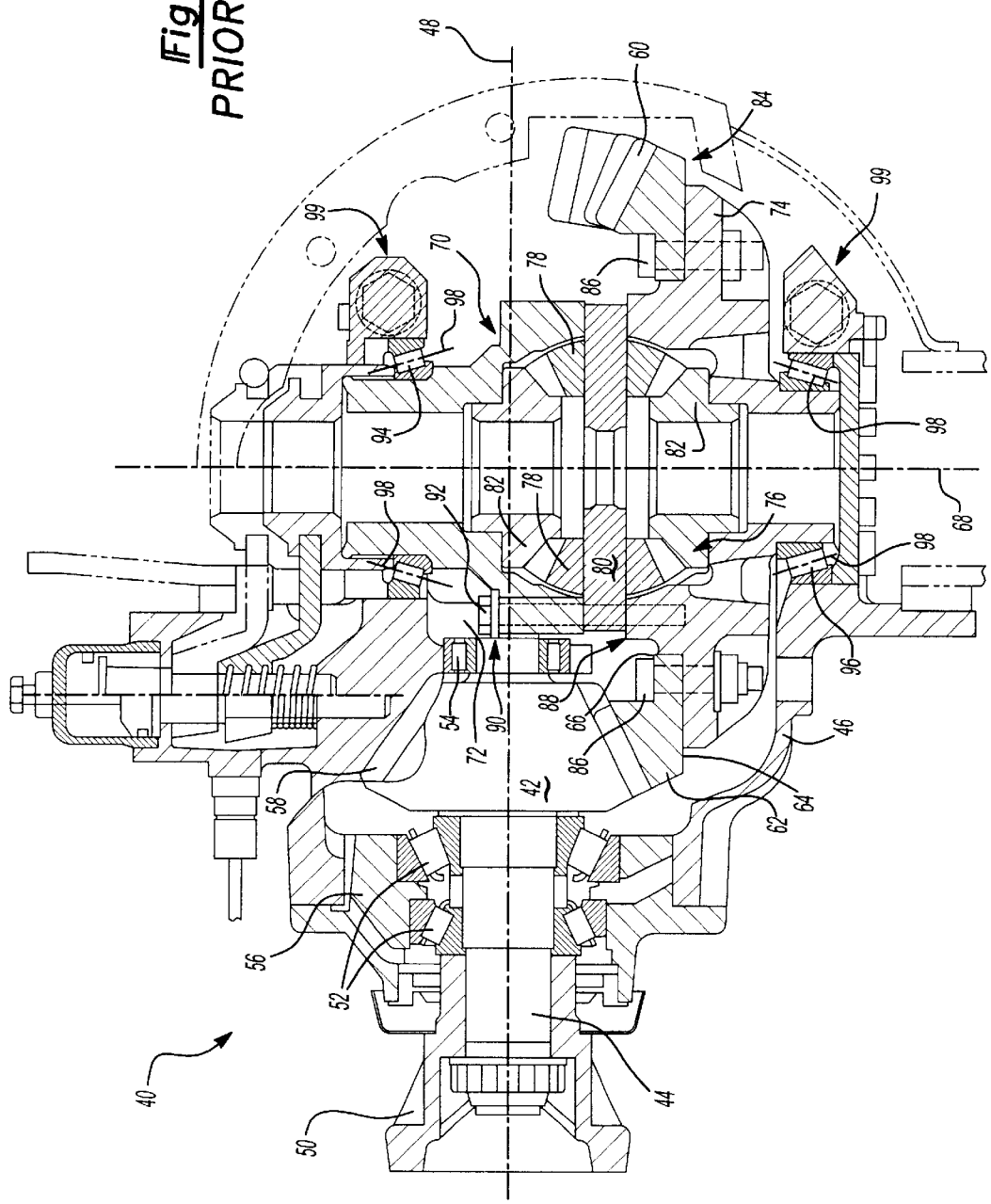
FIG. 2 is a cross-sectional view of a prior art carrier and differential assembly.

A traditional carrier and differential assembly 40 is shown in greater detail in FIG. 2. The carrier and differential assembly 40 includes an input pinion gear 42 supported on a pinion shaft 44 for rotation relative to a carrier housing 46 about a pinion axis of rotation 48. The pinion shaft 44 is coupled to the driveshaft 16 with a yoke assembly 50 as is known in the art. The pinion shaft 44 is supported by a pair of tapered roller bearings 52 positioned on one side of the pinion gear 42 and by a spigot bearing 54 positioned on an opposite side of the pinion gear 42. A single piece bearing cage 56 supports both tapered roller bearings 52.

The pinion gear 42 includes a plurality of pinion teeth 58 that are in meshing engagement with a plurality of teeth 60 formed on a ring gear 62. The ring gear 62 has a back side 64 and a front side 66 on which the teeth 60 are formed. The pinion gear 42 drives the ring gear 62 about a ring gear axis of rotation 68 that is transverse to the pinion gear axis of rotation 48.

A traditional differential assembly is shown generally at 70 in FIG. 2. The differential assembly 70 includes a first differential case half 72, a second differential case half 74, and a differential gear assembly 76. The first 72 and second 74 differential case halves support the differential gear assembly 76. The differential gear assembly 76 includes four (4) differential pinion gears 78 (only two are shown), supported on a four-legged differential spider 80 as is known in the art. The differential pinion gears 78 intermesh with a pair of side gears 82 that are splined to the axle shafts 32. The operation of the differential assembly is well known and will not be discussed in detail.

The ring gear 62 is attached to the second differential case half 74 at a first bolted joint 84 with a plurality of fasteners 86. The first 72 and second 74 differential case halves are attached to each other, defining a differential case split line 88, at a second bolted joint 90 with a plurality of fasteners 92 (only one is shown). The differential case split line 88 is positioned on the front side 66 of the ring gear 62.

A first tapered roller bearing 94 supports the first differential case half 72 relative to the carrier housing 46 and a second tapered roller bearing 96 supports the second differential case half 74 relative to the carrier housing 46. The tapered roller bearings 94, 96 each define a pair of apexes 98 that converge toward one another as they extend outwardly away from the ring gear 62.

The carrier housing is split on centerline extending along axis 68, allowing removable caps 99 as required to allow assembly of the differential case halves 72 and 74 into the carrier housing.

This traditional carrier and differential assembly 40 configuration is expensive to manufacture and difficult to assemble. Also, with the increased demand for more robust component designs within the same packaging space, these traditional configurations do not provide room to make critical components more robust within the existing package.

Figure 3:
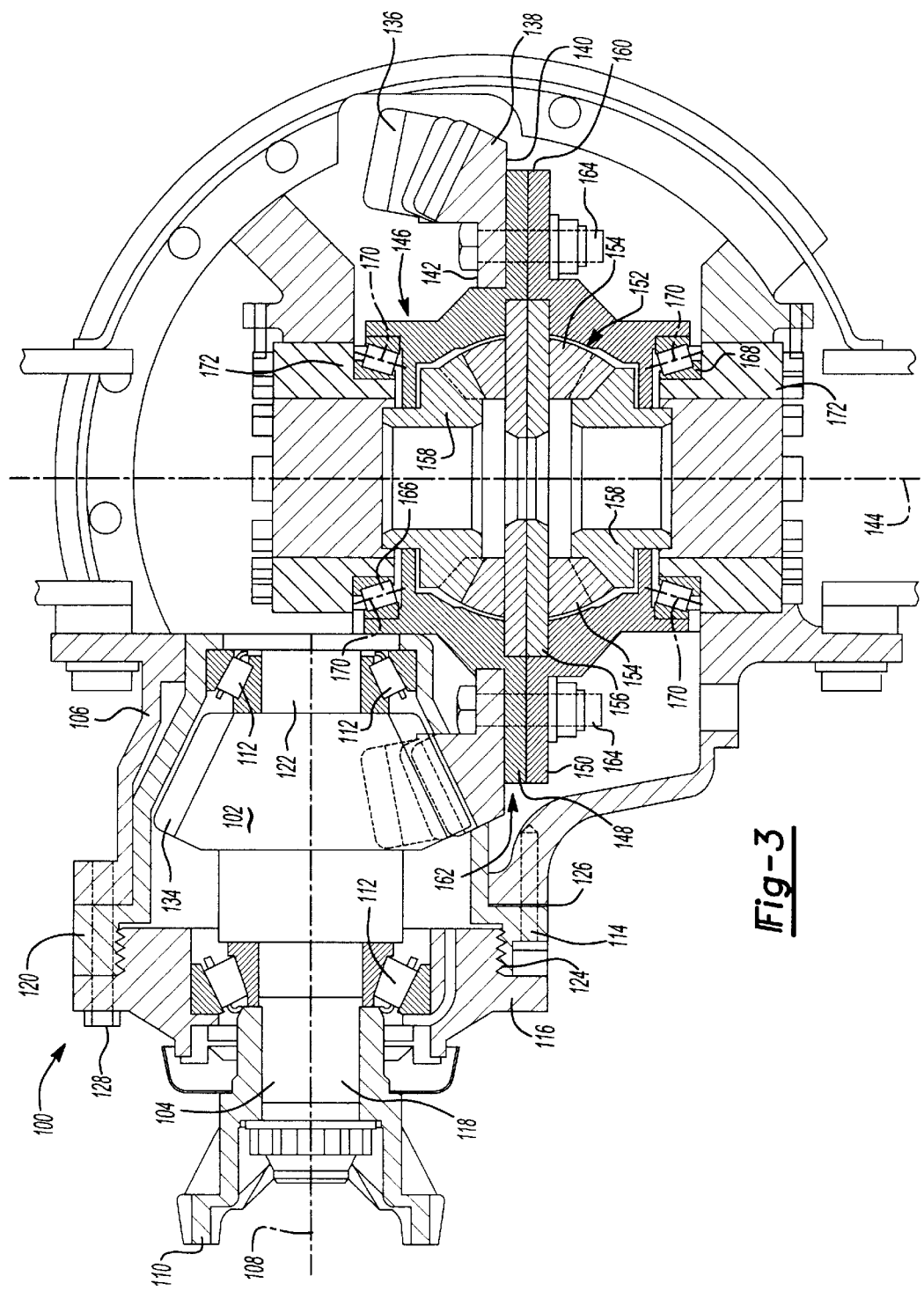
FIG. 3 is a cross-sectional view of a carrier and differential assembly incorporating the subject invention.

The subject invention as shown in FIG. 3 provides an improved carrier and differential configuration that significantly reduces the number of components, is easy to assemble, and provides more robust components than traditional configurations. An improved carrier and differential is shown generally at 100 in FIG. 3. The carrier and differential assembly 100 includes an input pinion gear 102 supported on a pinion shaft 104 for rotation relative to a carrier housing 106 about a pinion axis of rotation 108. The pinion shaft 104 is coupled to the driveshaft 16 with a yoke assembly 110 as is known in the art. The pinion shaft 104 is solely supported by a pair of tapered roller bearings 112 positioned on opposite sides of the pinion gear 102.

A two-piece pinion bearing cage is used to provide support for the tapered roller bearings 112. A first bearing cage member 116 supports one of the tapered roller bearings 112 at a first end 118 of the pinion shaft 104. A second bearing cage member 120 supports the other tapered roller bearing 112 at a second end 122 of the pinion shaft 104. The first end 118 is adjacent to the yoke assembly 110 and the second end 122 is adjacent to the pinion gear 102. The pinion gear 102 is supported on the pinion shaft 104 between the two (2) tapered roller bearings 112. The first bearing cage member 116 substantially surrounds the outer bearing 112 and the second bearing cage member 120 substantially surrounds the inner bearing 112.

Preferably the first bearing cage member 116 is threaded to the second bearing cage member 120, shown at 124 in FIG. 3, to simplify setting of the bearing preload and to eliminate the need for preload shims in an alternate embodiment. Contact shims 126 are positioned between the second bearing cage member 120 and the carrier housing 106. The contact shims 126 can also be used as preload shims. Temporary cap screws 114 (only one is shown) are preferably used to hold the cage member 120 during preload setting. Fasteners 128 are used to permanently attach the first 116 and second 120 bearing cage members to the carrier housing 106.

Figure 4:
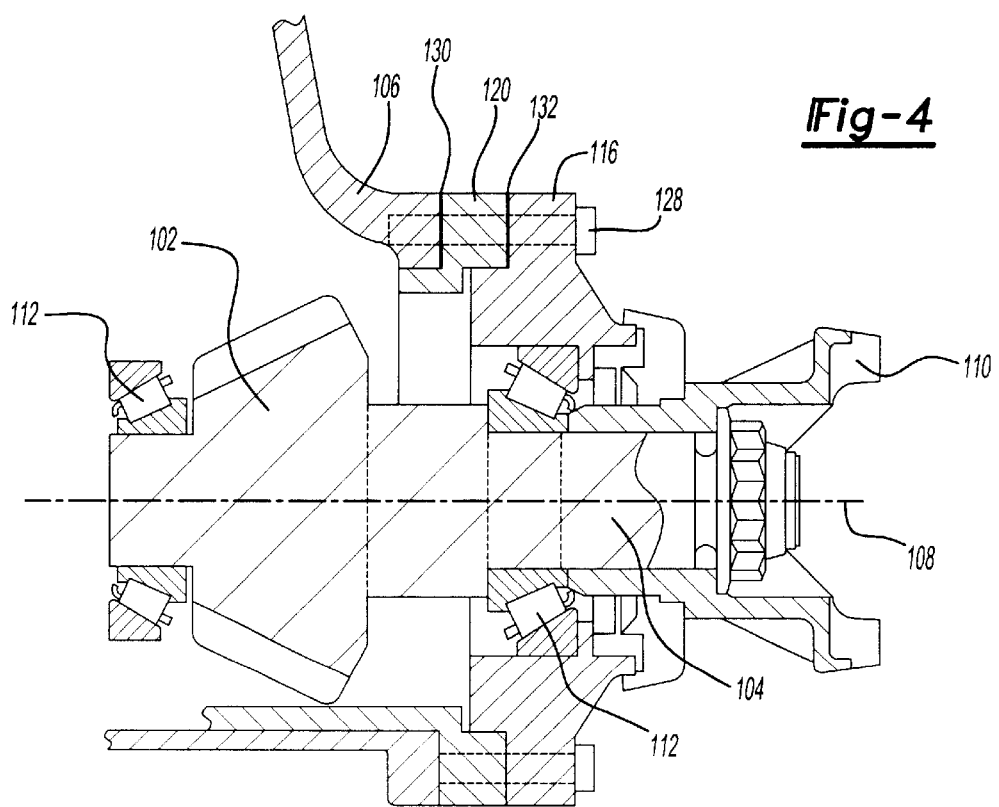
FIG. 4 is a cross-sectional view, partially broken away, of an alternate embodiment of a pinion cage assembly.

In an alternate embodiment as shown in FIG. 4, the first 116 and second 120 bearing cage members are bolted to the carrier housing 106 with fasteners 128. Contact shims 130 are installed between the carrier housing 106 and the second bearing cage member 120 and preload shims 132 are installed between the first 116 and second 120 bearing cage members. In this configuration, the contact 130 and preload 132 shims are the same.

The second bearing cage member 120 allows simplification of the mounting casting because the traditional spigot bearing is not required in this configuration. Further, pressing off of pinion bearings during the preload setting, as traditionally done, is eliminated as the preload is set with external shims 132. As discussed above, the contact and preload shims 126 can be the same. The threaded pinion cage 114 would simplify setting the preload and eliminate the need for external preload shims 132.

The pinion gear 102 includes a plurality of pinion teeth 134 that are in meshing engagement with a plurality of teeth 136 formed on a ring gear 138. The ring gear 138 has a back side 140 and a front side 142 on which the teeth 136 are formed. The pinion gear 102 drives the ring gear 138 about a ring gear axis of rotation 144 that is transverse to the pinion gear axis of rotation 108.

A unique differential assembly is shown generally at 146 in FIG. 3. The differential assembly 146 includes a first differential case half 148, a second differential case half 150, and a differential gear assembly 152. The first 148 and second 150 differential case halves support the differential gear assembly 152. The differential gear assembly 152 includes four (4) differential pinion gears 154 (only two are shown), supported on a four-legged differential spider 156 as is known in the art. The differential pinion gears 154 intermesh with a pair of side gears 158 that are splined to the axle shafts 32.

The first 148 and second 150 differential case halves are attached to each other, defining a differential case split line 160 that is positioned on the back side 140 of the ring gear 138. The ring gear 138, first differential case half 148, and second differential case half 150 are all connected together at a single bolted joint 162 with a plurality of fasteners 164.

Movement of the differential case split line 160 behind the ring gear 138 allows the same fasteners 164 to hold both the case halves 148, 150 together as well as the ring gear 138 to the case halves 148, 150. This reduces the number of bolted joints from two (2) to one (1). Further, with this configuration, both case halves 148, 150 can be the same part, which eliminates one component from the differential assembly 146 and doubles the volume of an existing component. In this configuration, the ring gear 138 preferably has a smaller center bore than is traditionally used so that both case halves 148, 150 can be the same.

Note that in this configuration, the spigot bearing is no longer required for supporting the pinion shaft 104. One benefit with this configuration is that since the differential spider diameter is no longer restricted by the proximity of the pinion spigot bearing, the spider and 156 and differential gear nest can be enlarged. Thus, a larger differential gear assembly 152 can be installed within the same packaging space required for a traditional design.

Another benefit is that, due to the re-positioning of the differential case halves 148, 150 and the elimination of the spigot bearing, only two bearings 112 are required to support the pinion shaft 104. As described above, one bearing 112 is on an external side of the pinion gear 102 and the other bearing 112 is on an internal side of the pinion gear 102 in the position that normally would have been occupied by the spigot bearing. This bearing configuration eliminates the need for one ground diameter on the pinion gear 102 during manufacture, which reduces cost. Another benefit with this bearing configuration is that since there are no longer two adjacent bearings on one side of the pinion gear 102, the inner bearing no longer blocks or reduces oil supply for lubrication to the outer bearing. Thus, the lubrication for the pinion shaft bearings 112 is improved over traditional bearing configurations.

In order to keep the same pinion location as is in a traditional axle, the pinion may need to be shifted from a traditional location. Thus, the reconfiguration of the differential case 148, 150 may require relocation of the bowl portion in the axle housing 24.

A first tapered roller bearing 166 supports the first differential case half 148 relative to the carrier housing 106 and a second tapered roller bearing 168 supports the second differential case half 150 relative to the carrier housing 106. The tapered roller bearings 166, 168 are mounted in a reverse configuration than that which is traditionally used. In this reverse configuration, the bearings 166, 168 include a plurality of rollers that define apexes 170. Each bearing 166, 168 has at least a pair of apexes 170 that diverge away from one another as the apexes 170 extend outwardly away from the ring gear 138.

In this reverse configuration, the cups of the bearings 166, 168 are pressed into the respective differential case half 148, 150 and the cones are pressed onto extended adjusting rings 172. Thus, each bearing 166, 168 is installed between an adjusting ring 172 and one of the case halves 148, 150. This configuration provides several advantages. One advantage is that the bearing cups are pressed in, which eliminates cup rotation. Another advantage is that the bearing apexes 170 in each bearing 166, 168 diverge away from one another to provide increased stability and to reduce the need for thrust screws. Another advantage is that because the differential case bearing diameters do not extend into leg bores, removable leg caps (99 in FIG. 1) are no longer required for carrier mounting.

The subject invention provides an improved carrier with a differential assembly 100 that includes a more robust component configuration within a traditional package. This carrier configuration further reduces the overall number of required components and is less expensive to manufacture. Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. A carrier assembly for a drive axle comprising:
   a pinion gear operably coupled to an input shaft for rotation relative to a carrier housing about a pinion gear axis of rotation wherein said pinion gear includes a plurality of pinion gear teeth and is supported on a pinion shaft having an exterior end supported for rotation relative to said carrier housing with a first bearing assembly and an interior end supported for rotation relative to said carrier housing with a second bearing assembly;
   a pinion cage having a first cage portion and a second cage portion attachable to said first cage portion wherein said first bearing assembly is installed between said first cage portion and said exterior end of said pinion shaft and said second bearing assembly is installed between said second cage portion and said interior end of said pinion shaft;
   a ring gear driven by said pinion gear for rotation about a ring gear axis of rotation transverse to said pinion gear axis of rotation, said ring gear having a back side and an opposing front side having a plurality of ring gear teeth in meshing engagement with said pinion gear teeth; and
   a differential assembly including a first differential case half, a second differential case half attachable to said first differential case half at an interface to define a case split line, and a differential gear assembly supported by said first and second case halves and operably coupled to drive a pair of laterally spaced wheels wherein said case split line is positioned on said back side of said ring gear.

2. An assembly as set forth in claim 1 wherein said ring gear, first differential case half, and second differential case half are all connected together via a single bolted joint.

3. An assembly as set forth in claim 1 wherein said first differential case half is supported for rotation relative to said carrier housing on a first bearing assembly positioned on said front side of said ring gear and said second differential case half is supported for rotation relative to said carrier housing on a second bearing assembly positioned on said back side of said ring gear.

4. An assembly as set forth in claim 3 wherein said first bearing assembly comprises a first tapered roller bearing with a first set of rollers defining at least a first pair of bearing apexes that diverge away from one another in a direction extending outwardly from said front side of said ring gear and said second bearing assembly comprises a second tapered roller bearing with a second set of rollers defining at least a second pair of bearing apexes that diverge away from one another in a direction extending outwardly from said back side of said ring gear.

5. An assembly as set forth in claim 3 including first and second adjusting rings with said first bearing assembly being solely supported between said first adjusting ring and said first differential case half and said second bearing assembly being solely supported between said second adjusting ring and said second differential case half.

6. An assembly as set forth in claim 5 wherein said first and second bearing assemblies each include a cup portion pressed into engagement with one of said first or second differential case halves and a cone portion pressed into engagement with one of said first or second adjusting rings.

7. An assembly as set forth in claim 1 wherein said pinion gear is positioned on said pinion shaft between said first and second bearing assemblies.

8. An assembly as set forth in claim 7 wherein said pinion shaft is solely supported for rotation relative to said carrier housing with said first and second bearing assemblies.

9. An assembly as set forth in claim 8 wherein said first and second bearing assemblies comprise tapered roller bearings.

10. An assembly as set forth in claim 1 wherein said pinion gear is positioned on said pinion shaft between said first and second bearing assemblies and is substantially surrounded by said second cage portion.

11. An assembly as set forth in claim 10 wherein said first cage portion, said second cage portion, and said carrier housing are all connected together via a single bolted joint.

12. An assembly as set forth in claim 11 including at least one contact shim positioned between said carrier housing and said second cage portion.

13. An assembly as set forth in claim 12 wherein said contact shim is operable to preload said bearing assemblies.

14. An assembly as set forth in claim 1 wherein said first cage portion is threadably attached to said second cage portion for setting preload for said first and second bearing assemblies.

15. A carrier assembly for a drive axle comprising:
a pinion gear operably coupled to an input shaft for rotation relative to a carrier housing about a pinion gear axis of rotation wherein said pinion gear includes a plurality of pinion gear teeth and is supported on a pinion shaft having an exterior end supported for rotation relative to said carrier housing with a first tapered roller bearing and an interior end supported for rotation relative to said carrier housing with a second tapered roller bearing with said pinion gear being positioned between said first and second tapered roller bearings;
a pinion cage having a first cage portion and a second cage portion attached to said first cage portion wherein said first tapered roller bearing is installed between said first cage portion and said exterior end of said pinion shaft and said second tapered roller bearing is installed between said second cage portion and said interior end of said pinion shaft;
a ring gear driven by said pinion gear for rotation about a ring gear axis of rotation transverse to said pinion gear axis of rotation, said ring gear having a back side and an opposing front side having a plurality of ring gear teeth in meshing engagement with said pinion gear teeth; and
a differential assembly including a first differential case half, a second differential case half attachable to said first differential case half at an interface to define a case split line positioned adjacent said back side of said ring gear, and a differential gear assembly supported by said first and second case halves and operably coupled to drive a pair of laterally spaced wheels wherein said ring gear, first differential case half, and second differential case half are all connected together via a single bolted joint.

16. An assembly as set forth in claim 15 including first and second adjusting rings wherein said first differential case half is supported for rotation relative to said carrier housing on a third tapered roller bearing positioned on said front side of said ring gear between said first adjusting ring and said first differential case half and said second differential case half is supported for rotation relative to said carrier housing on a fourth tapered roller bearing positioned on said back side of said ring gear between said second adjusting ring and said second differential case half.

17. An assembly as set forth in claim 15 wherein said second cage portion is threadably attached to said first cage portion.

18. A carrier assembly for a drive axle comprising:
a pinion shaft having an exterior end and an interior end defining a pinion axis of rotation;
a pinion gear supported by said pinion shaft for rotation relative to a carrier housing;
a first single bearing assembly supporting said exterior end of said pinion shaft for rotation relative to said carrier housing;
a second single bearing assembly supporting said interior end of said pinion shaft for rotation relative to said carrier housing wherein said pinion gear is positioned between said first and second single bearing assemblies;
a pinion cage having a first cage portion and a second cage portion attachable to said first cage portion wherein said first single bearing assembly is installed between said first cage portion and said exterior end of said pinion shaft and said second single bearing assembly is installed between said second cage portion and said interior end of said pinion shaft;
a ring gear driven by said pinion gear for rotation about a ring gear axis of rotation transverse to said pinion axis of rotation; and
a differential assembly operably coupled to said ring gear for driving a pair of laterally spaced wheels.

19. An assembly as set forth in claim 18 wherein said first and second single bearing assembly each comprise a single tapered roller bearing.

20. An assembly as set forth in claim 19 wherein said ring gear includes a back side and an opposing front side having a plurality of ring gear teeth in meshing engagement with said pinion gear and wherein said differential assembly includes a first differential case half, a second differential case half attachable to said first differential case half at an interface to define a case split line positioned on said back side of said ring gear, and a differential gear assembly supported by said first and second case halves with said ring gear, first differential case half, and second differential case half all being attached together via a single bolted joint.

* * * * *